United States Patent [19]
Gunlock

[11] 3,779,651
[45] Dec. 18, 1973

[54] LIGHT GAUGE FOR IDENTIFYING PLANTS THAT CAN GROW IN A PARTICULAR LOCATION
[76] Inventor: Theodore Gunlock, 1450 W. 228th St., Torrance, Calif.
[22] Filed: Nov. 20, 1972
[21] Appl. No.: 308,055

[52] U.S. Cl. ................. 356/213, 47/1, 356/191, 356/215, 356/256
[51] Int. Cl. .......................... G01j 1/00, G01j 1/46
[58] Field of Search ................ 356/191, 192, 193, 356/194, 213, 215, 256

[56] References Cited
UNITED STATES PATENTS
2,337,534  12/1943  Barber ........................... 356/213

Primary Examiner—David Schonberg
Assistant Examiner—V. P. McGraw
Attorney—Julius L. Rubinstein

[57] ABSTRACT

One or more strips of light-sensitive material covered by a filter are mounted on a support. A plurality of colors are printed on the support corresponding to the color changes experienced by the light-sensitive material when various quantities of radiation fall on it. A legend is associated with each printed color identifying to plants that can grow in a particular location where the light falling on the light-sensitive material in that location over a predetermined period, causes a color change in the light-sensitive material corresponding to that printed color.

10 Claims, 10 Drawing Figures

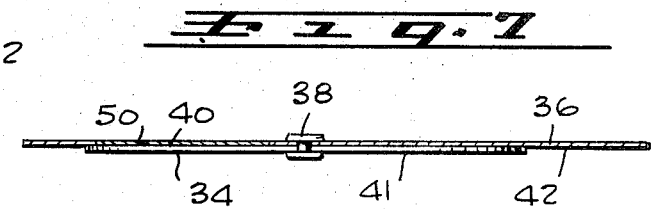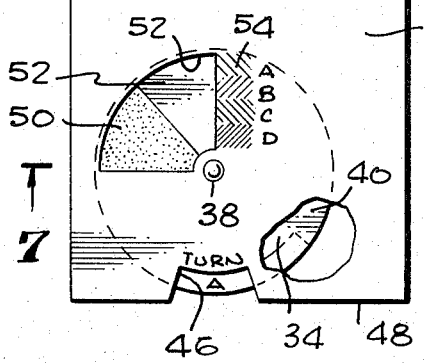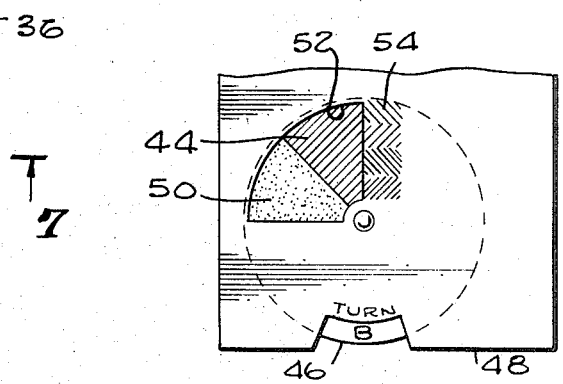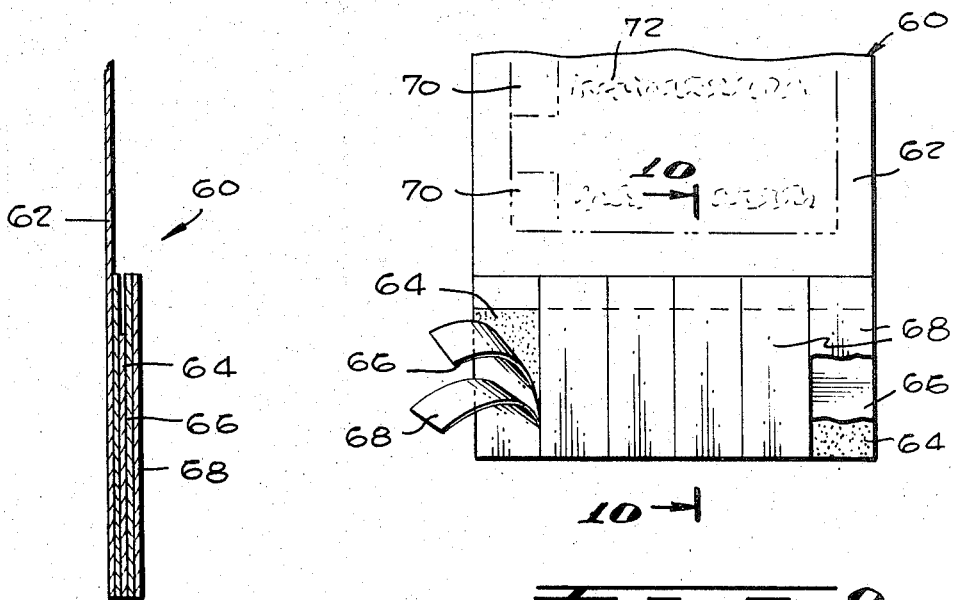

LIGHT GAUGE FOR IDENTIFYING PLANTS THAT CAN GROW IN A PARTICULAR LOCATION

BACKGROUND AND BRIEF SUMMARY

Various plants have different daily light requirements for proper growth. Consequently, when growing a particular plant, care must be taken in selecting a location which has sufficient light.

The correct daily light requirement for a plant is not easy to measure because the light intensity, either indoors or outdoors, fluctuates considerably throughout the day. For this reason, when a plant is to be grown indoors, fluctuations in light from the sum are combined with light from indoor lamps which are switched on and off and this causes severe fluctuations in light intensity.

When a plant is to be grown outdoors, the location of adjacent buildings, trees and shrubbery, along with the varying shadows caused by the movement of the sun and clouds, also cause fluctuations in light intensity.

Consequently, in the case of plants to be grown indoors or outdoors, a measurement of the light in a particular location having a fluctuating light intensity over a 24-hour period or at least a substantial portion of a day is necessary to provide sufficient formation to determine which plants can grow in that location.

In this invention, material of a kind which darkens in proportion to the duration and intensity of light falling on it is covered by a light filter and is mounted on a support. In addition, a plurality of colors are printed on the support to be used with the light-sensitive material. The colors correspond to the various colors of the light-sensitive material after they have been exposed to various intensities of filtered light for a 24-hour period. A legend is associated with each printed color identifying the plants which can grow when exposed to light which causes that color change in the light-sensitive material over a 24-hour period. Thus, by exposing the light-sensitive material to filtered light in a particular location for a 24-hour period, and then comparing the darkened light-sensitive material with a substantially identical printed color on the support, one can by reading the legend associated with that printed color, identify which plants can grow in that location. Furthermore, if it is desired to grow certain plants in a particular place, the light gauge can be used to provide information so one can add or subtract light in that region until the light gauge indicates that the light intensity in that region is proper for a particular plant.

What is needed, therefore, and comprises an important object of this invention, is to provide a light gauge for plants which can measure the integrated quantity of light falling in a particular location over a predetermined period so that plants selected to be grown in that location will have sufficient light for its requirements.

This, and other objects of this invention, will become more apparent when better understood in light of this specification and accompanying drawings wherein:

FIG. 6 is a plan view of a second modification of a light gauge embodying the principles of this invention.

FIG. 7 is a sectional view taken under line 7—7 of FIG. 6.

FIG. 8 is a portion of the modification shown in FIG. 6 after a sector of the light-sensitive disc has been exposed to light for a 24-hour period and the disc has been rotated until the exposed sector appears in a window in the support.

FIG. 9 is a plan view of a third modification of the light gauge embodying the principles of this invention.

FIG. 10 is a sectional view taken under line 10—10 of FIG. 9.

Figure 1:
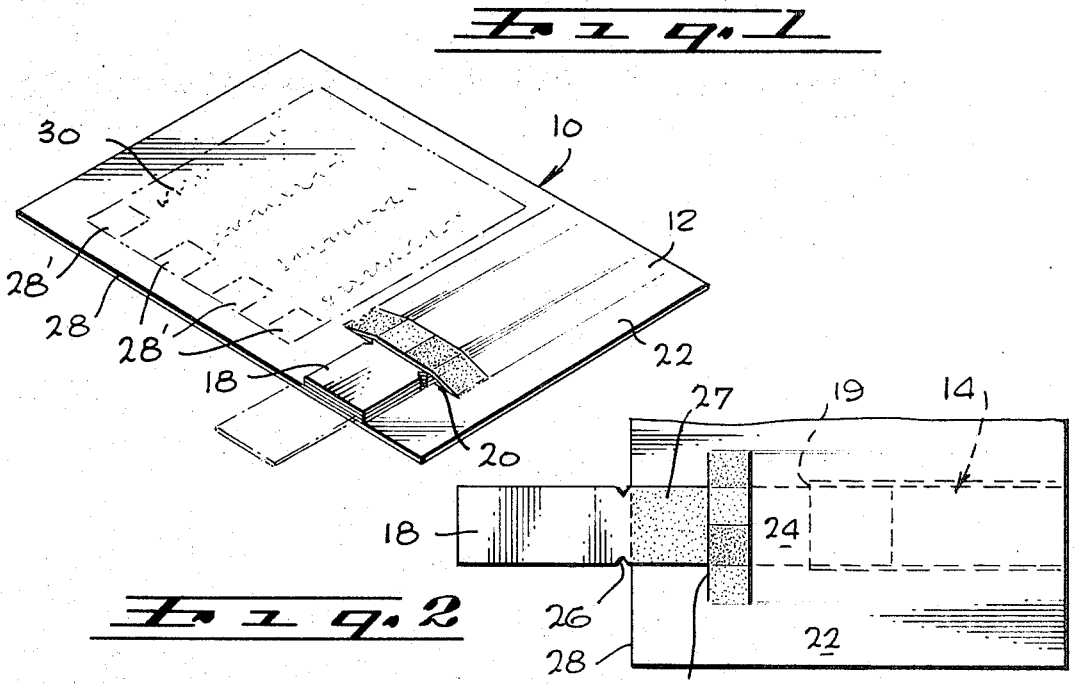
FIG. 1 is a perspective view of the light gauge embodying the principles of this invention.
Figure 4:
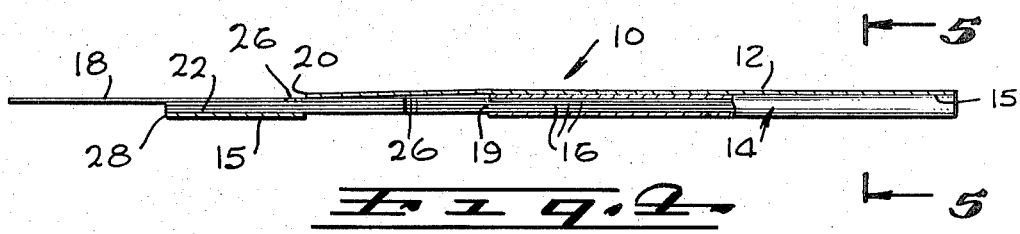
FIG. 4 is a sectional view taken under line 4—4 of FIG. 2.
Figure 5:
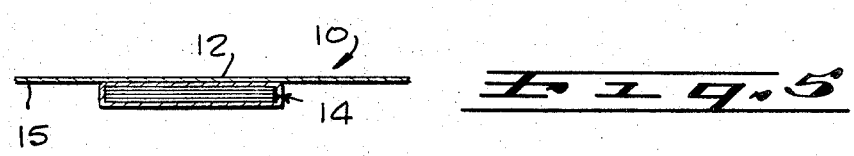
FIG. 5 is a sectional view taken on line 5—5 of FIG. 4.

Referring now to FIG. 1 of the drawing, the light gauge indicated generally by the reference numeral 10 comprises a support 12 formed from some suitable material such as paper or cardboard. An opaque envelope 14 serving as a cover is secured to the undersurface 15 of the support 12, see FIG. 5. A plurality of strips 16 of light-sensitive paper, preferably of the kind which darkens in proportion to the intensity and duration of the light falling on it, is stacked inside the opaque envelope 14. Each strip of light-sensitive paper includes a pull tab 18 and the tab 18 extends out of the mouth 19 of the opaque envelope through a slit 20 formed in support 12 so the tabs 18 rest on the upper surface 22 of the support 12, see FIGS. 1 and 4. The material comprising region 24 of support 12 between the mouth 19 of envelope 14 and the slit 20 is selected so it attenuates light passing through it whereby it functions as a light filter, although it is understood that the entire support 12 could be selected from a material which has the same light transmitting properties in order to eliminate the need for constructing region 24 from a separate material. This arrangement would give the support 12 a dual function in that it would serve as a support and as a light filter for reasons to become apparent below.

Each strip is provided with an index notch 26. In use, the pull tab 18 of the top strip of the light sensitive paper in the envelope 14 is first pulled, causing the attached strip 16 to move out of the envelope until the index notch 26 is at the slit 20 with the light sensitive part of the strip beneath the filter 24, see FIG. 2. Then the light gauge is exposed to light falling on the upper surface 22 of support 12 at the filter region 24 for preferably a 24-hour period. This extended period of measurement is desirable because of the fluctuating characteristics of the intensity of the light. If the period of measurement is too short, accuracy would be adversely affected. The light penetrating the filter 24 and falling on the light sensitive paper causes this paper to change color, i.e., darken, in accordance with the quantity of light falling on it during this period. Next, the tab 18 is again pulled so the light sensitive strip moves until the notch 26 is at the edge 28 of support 12, see FIG. 3, revealing a strip 27 of the light sensitive paper which has been darkened because of light falling on support 12 and passing through the filter region 24. Hence the color change on the light sensitive paper is a measure of an integrated quantity of light, or the total amount of light falling on the light gauge for that entire period.

Although an extended period of time, e.g., 24 hours, is preferable, because of its greater accuracy, the invention could be practiced by exposing the light sensitive strip for a lesser period. However, the gauge should be used for at least a substantial period of time in locations where the variations in the intensity of light permit this shortened time without an intolerable decrease in accuracy.

Figures 2, 3:
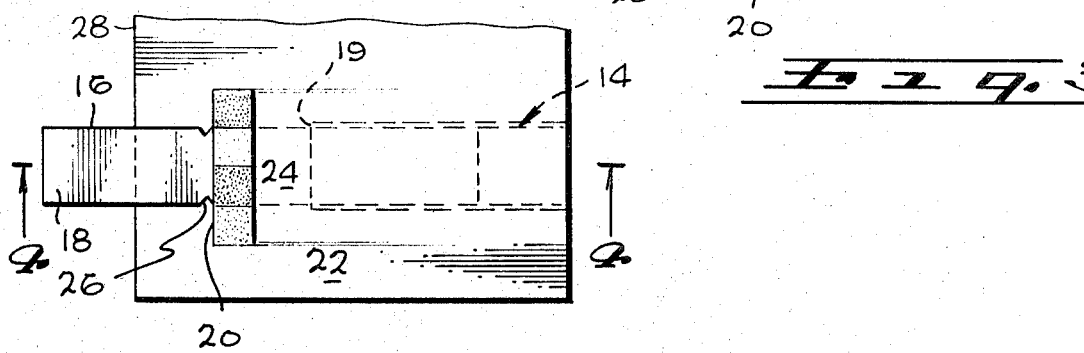
FIG. 2 is a plan view of a portion of the light gauge shown in FIG. 1, showing a strip of light-sensitive paper partially withdrawn from ts opaque envelope.
FIG. 3 is a plan view similar to that shown in FIG. 2 showing a strip of light-sensitive paper further withdrawn from its opaque envelope after a 24-hour exposure in a location having a fluctuating light intensity and revealing its color change.

Experienced horticulturists know the light requirement for various plants, and hence using the light sensitive paper covered by the filter 24, the color change of the light sensitive period over a 24-hour period corresponding to the light requirement for a particular plant can be determined. These various colors are printed on support 12 at region 28, see FIG. 1, and a legend 30 is associated with each color identifying the plants which can grow in the region exposed to light which causes a corresponding color change in the light sensitive strip 16. Hence, after the light sensitive strip 16 has been first pulled out of the envelope 14 as shown in FIG. 2 and has been exposed to light for a 24-hour period, the light sensitive strip is then pulled to the position shown in FIG. 3 where the darkened portion 27 is compared with the printed colors 28 on support 12. The legend associated with the printed color most closely resembling the color of the darkened portion 27 identifies the plants which can grow in the light available at that region.

The use of the light filter 24 is important because it diminishes the intensity of light falling on the light sensitive paper to such an extent that commercially available light sensitive paper used with the gauge does not turn completely dark even when exposed to the greatest quantity of light likely to be encountered over a 24-hour period. This is important because it permits inexpensive easily available fast acting light sensitive paper to be used in the light gauge. Without the filter, the strips of light sensitive paper would all become completely dark before the 24-hour period, thus, so that comparisons could not be made between the various colors.

As stated above, it is important that the light gauge be used to measure light falling on it over an extended period, e.g., 24 hours, for better accuracy. This is because the light sensitive paper in the gauge integrates all the light falling on it, and this light is a combination of the varying light from the sun and artificial light when the gauge is used inside the house. If the period selected for measurement is not large enough, transitory fluctuations in the intensity of the sun light and temporary changes in illumination indoors could be misleading when using the light gauge to determine the quantity of light necessary for a particular plant in a particular location.

The light gauge 32 as shown in FIG. 6 is another embodiment of this invention. In this embodiment a disc 34, see FIGS. 6 and 7, is rotatedly mounted on a support 36 by means of a pivot 38. The support may be formed from any suitable material such as paper or cardboard.

The surface 40 of the disc bearing against the under surface 42 of the support is coated with a light sensitive material which darkens as it is exposed to light in proportion to the duration and intensity of the light falling on it. The disc is formed from a suitably opaque material such as plastic, or is formed from cardboard coated on its undersurface 41 to make it opaque to light. The light sensitive surface 40 of the disc is divided into sectors 44, and each sector is identified by indicia, in this case letters, see FIG. 6. A recess 46 is formed at the edge 48 of the support 36 to provide means for turning the disc 34 and to center the indicia printed on the periphery of the disc in the recess 46 for reasons to be described below.

If the material composing the support 36 is not opaque to light, the undersurface 42 of support 36 abutting the disc is coated with an opaque substance, or an opaque material that is glued thereon to serve as a cover for covering the light sensitive material. However, region 50 of support 36 preferably shaped like a sector of the disc is made to serve as a light filter, and so is not opaque to light. Region 50 is coaxial with and above said disc and can be composed of the same paper or cardboard as support 36, if that material functions satisfactorily as a light filter, or else it may be composed of a special material having the desired light attenuation characteristics.

In addition, as shown in FIGS. 6 and 8, a sector shaped portion is cut out from support 36 adjacent the sector shaped filter region 50 to provide a window 52.

A plurality of color bands 54 are printed on the surface of support 36 and these color bands serve the same function as the color bands 28 printed on support 12 in the embodiment shown in FIG. 1.

Similarly, a legend 56 is associated with each color band for identifying the plants which can grow when an exposed sector of the color disc darkens to the color of a corresponding color band after the light gauge has been exposed to light in a particular location having a fluctuating slight intensity for a 24-hour period, as explained in connection with the embodiment shown in FIG. 1.

In use, the disc is rotated until the indicia A appears in the center of recess 46. This positions the first sector 44 of the disc 34 beneath the light filter 50 so that light falling on the surface of the light gauge, although substantially attenuated as it passes through the light filter, darkens this first sector 44 of disc 34. After the light gauge has been exposed for a 24-hour period in the particular location, the disc is rotated until the indicia B is centered in recess 46 and the first sector appears in the window 52 where its color is compared with the adjoining color bands 54 while a new sector of the disc moves beneath the light filter. In this way the person using the gauge can, by reading the legend corresponding to the proper color band, known which plants can grow in that location. When the light gauge is not being used, the light filter 50 may be covored by an opaque tape, not shown, so that the sector 44 of the disc below the light filter does not receive any radiation.

In the embodiment shown in FIG. 9, the light gauge 60 comprises a support 62 formed from any suitable material such as paper or cardboard. A plurality of strips 64 of light sensitive material of the kind which darkens when exposed to light, is secured to support 62 by any suitable means such as gluing. Each light sensitive strip is covered by an overlying strip of a material 66 which serves as a light filter and which functions to substantially attenuate light falling on the strip. In addition, a strip of opaque material 68 serving as a cover overlies each strip 66 of the light filter. With this arrangement, each strip of light sensitive material is in the form of a three-layer packet secured to support 62.

Strips 66 and 68 are attached to strip 66 in such a way that they can be conveniently torn away from it.

As seen, color bands 70 and legends 72 are printed on support 62 for the reasons described in connection with the previous embodiments of this invention.

In use, the color gauge is placed in the region where the light intensity is to be measured and the opaque strip 68 is pulled off of one of the strips 64. This exposes the underlying light strip 64 to light attenuated by passing through the filter strip 66. Then after a 24-hour period, the filter strip 66 is torn away exposing the color change in the light sensitive strip 64, and this color change is compared with the color band 70 for use in the manner described above.

Although to this point the light sensitive material has been disclosed in the drawings in form of strips, or a disc coated with light sensitive material, it is comtemplated the invention could be practiced with other forms. For example, the embodiment shown in FIG. 1 and FIG. 9 could be used with light sensitive material in the form of liquids enclosed in glass or plastic vials. In such an embodiment, the vials could be colored to serve as a light filter, if required to slow down the rate of color change of the liquids inside so that they do not reach their maximum color change even when exposed to the most intense light likely to be encountered over a 24-hour period.

So far the light gauge has been described for use in determining which plants can grow in the available light in a particular location. However, in circumstances where it is desired to grow a particular plant in a particular location, the light gauge can be used to provide information as to the illumination requirements for that plant so that the available light in that location can be added and diminished.

I claim:

1. A light gauge for plants comprising a support, light sensitive material which changes color in proportion to the intensity and duration of light falling on it on the support, an opaque cover on the support for covering said light sensitive material when the light gauge is not in use, means for withdrawing said light sensitive material from said opaque cover when the light gauge is used, said light sensitive material selected so it does not reach its maximum color change when exposed to the most intense light likely to be encountered over a substantial period of time, areas of colors printed on the support, said areas of colors comprising the colors of the light sensitive material after it is exposed to various intensities of light for said substantial period of time to provide a comparison with the color change on said light sensitive material, a legend associated with each printed color on said support so that when the area of color most nearly the color of the exposed light sensitive material is found after the light gauge has been exposed to light for said substantial period of time in a particular location having a fluctuating light intensity, the legend associated with said area of color identifies the plants which can best grow in that location, and the light gauge provides information as to the illumination requirements for a plant which is to be grown in that location so that the available light can be augmented or subtracted.

2. A light gauge for plants comprising a support light sensitive material which changes color in proportion to the intensity and duration of light falling on it mounted on the support, an opaque cover on the support for covering said light sensitive material when the light gauge is not in use, means for withdrawing said light sensitive material from said opaque cover when the light gauge is used, a light filter covering said light sensitive material for attenuating the intensity of the light penetrating said light filter and reaching said light sensitive material, means for observing said light sensitive material after exposure so that the color change of the light sensitive material can be observed when the light gauge is used, said light filter selected so the attenuation of the most intense light likely to be encountered over a substantial period of time prevents the light sensitive material from reaching its maximum color change, areas of colors printed on the support, said areas of colors comprising the colors of the light sensitive material after it is exposed to various intensities of light for said substantial period of time when covered by said light filter to provide a comparison with the color change on said light sensitive material, a legend associated with each printed color so that when the area of color most nearly the color of the exposed light sensitive material is found after the light gauge has been exposed to light for said substantial period of time in a particular location having a fluctuating light intensity, the legend associated with said area of color identifies the plants which can best grow in that location and the light gauge provides information as to the illumination requirement for a plant which is to be grown in that location so that the available light can be augmented or diminished.

3. A light gauge for plants comprising a support, light sensitive material of the kind which darkens in proportion to the intensity of light falling on it mounted on the support, an opaque cover on the support for covering said light sensitive material when the light gauge is not in use, means for withdrawing said light sensitive material from said opaque cover when the light gauge is used, a light filter covering said light sensitive material for attenuating the intensity of the light penetrating said light filter and reaching said light sensitive material, said light sensitive material separable from said filter so the color change of the light sensitive material can be observed from the light gauge is used, said light filter selected so the attenuation of the most intense light likely to be encountered over a substantial period of time prevents the light sensitive material from becoming totally saturated with light and reaching its maximum color change, areas of colors printed on the support, said areas of color comprising the colors of the light sensitive material after it is exposed to various intensities of light for said substantial period of time when covered by said light filter to provide a comparison with the color change on said light sensitive material, a legend associated with each color so that when the area of color most nearly the color of the exposed light sensitive material is found after the light gauge has been exposed to light for said substantial period of time in a particular location having a fluctuating light intensity, the legend associated with said area of color identifies the plants which can best grow in that location, and the light gauge provides information as to the illumination requirements for a plant which is to be grown in that location so the available light can be augmented or diminished.

4. A light gauge for plants comprising a support, an opaque envelope mounted on the support, a plurality of strips of light sensitive material which change color in proportion to the intensity and duration of the light falling on it, stacked inside said envelope, said strip having means thereon for pulling the strip of the light sensitive material to a position where it is exposed to light, each strip of light sensitive material selected so it does not reach its maximum color change when exposed to the most intense light likely to be encountered over a substantial period of time, areas of colors printed on the support, said areas of colors comprising the colors of the light sensitive material after it has been exposed to various intensities of light for said substantial period of time, to provide a comparison with the color change on said light sensitive strip, a legend associated with each printed color on said support, so that when the area of color most nearly like the color of the exposed light sensitive material is found after the light sensitive strip has been exposed to light for said substantial period of time in a particular location having a fluctuating light intensity, the legend associated with said area of color identifies the plants which can best grow in that location, and the light gauge provides information as to the illumination requirements for a plant which is to be grown in that location so the available light can be augmented or diminished.

5. A light gauge for plants comprising a support, an opaque envelope mounted on the support, a plurality of strips of light sensitive material which change color in proportion to the intensity and duration of the light falling on it stacked inside the said envelope, each strip having means thereon for pulling a strip of light sensitive material out of said envelope to a position where it is exposed to light, said support having a light filter thereon to attenuate the light falling on said support to said light sensitive strip, said light filter positioned so when each strip of light sensitive material is pulled from said envelope, it moves beneath said light filter, means for moving said light sensitive strip out from said light filter so the color change can be observed after the light gauge has been used, said light filter selected so the attenuation of the most intense light likely to be encountered over a substantial period of time prevents the light sensitive strip from reaching its maximum color change, areas of color printed on said support, said areas of color comprising the colors of the light sensitive strips after it has been exposed to various intensities of light for said substantial period of time beneath said light filter to provide a comparison with the color change on said light sensitive strip, a legend associated with each printed color on said support so that when the area of color most nearly like the color of the exposed light sensitive strip is found, the legend associated with said area of color identifies the plants which can best grow in that location, and the light gauge provided information as to the illumination requirements for a plant which is to be grown in that location so the available light can be augmented or diminished.

6. A light gauge for plants comprising a support, said support having an upper surface and a lower surface, an opaque envelope mounted on said lower surface, a plurality of strips of light sensitive material which change color in proportion to the intensity and duration of light falling on it stacked inside said envelope, each strip having means thereon for pulling it out of said envelope to a position where it is exposed to light, at least a portion of said support formed from a material which attenuates light passing there-through whereby it functions as a light filter, said light filter portion of said support positioned so when each light sensitive strip is pulled out of said envelope it moves beneath said light filter whereby light falling on the support is attenuated before it reaches said light sensitive strip, means for moving said light sensitive strip out from beneath said light filter portion of said support after said light gauge has been exposed to light in a location having a fluctuating light intensity for a substantial period of time so that the color change of the light sensitive strip can be observed, the characteristics of said light filter portion selected so the attenuation of the most intense light likely to be encountered over said substantial period of time prevents the light sensitive strip from reaching its maximum color change, areas of color printed on said support, said areas of color comprising the colors of the light sensitive strip after it has been exposed to various intensities of light for said substantial period of time beneath said light filter, to provide a comparison with the color change on said light sensitive strip, a legend associated with each printed color on said support so that when the area of color most nearly like the color of the exposed light sensitive strip is found, after the light sensitive strip has been exposed to light beneath said light filter portion for said substantial period of time in said location having a fluctuating light intensity, the legend associated with said area of color identifies the plants which can best grow in that location, and the light gauge provides information as to the illumination requirements for a plant which is to be grown in that location so that the available light can be augmented or diminished.

7. A light gauge for plants comprising a support, said support having an upper surface and a lower surface, an opaque envelope mounted on said lower surface, said envelope having a mouth, a plurality of strips of light sensitive material which darken in proportion to the intensity and duration of light falling on it stacked inside said envelope, each strip having a pull tab attached thereto, each pull tab extending out of the mouth of said envelope, said support having a slit formed therein in spaced relation to the mouth of said envelope, each pull tab extending through said slit to the upper surface of said support, at least the region of said support between the mouth of the envelope and said slit formed from a material which attenuates light passing there-through whereby it functions as a light filter, said light filter region of said support positioned so when each light sensitive strip is pulled out of said envelope by said pull tab it moves beneath said light filter whereby light falling on the light filter is attenuated before it reaches the light sensitive strip, said pull tab functioning to pull said light sensitive strip through said slit to where the color change of the exposed portion of the strip can be observed, the characteristics of said light filter selected so the attenuation of the most intense light likely to be encountered over a 24-hour period prevents the light sensitive strip from turning completely dark, bands of colors printed on said support, said bands of colors comprising the darker colors of the light sensitive strip after it has been exposed to various intensities of light for 24 hours beneath said light filter to provide a comparison with the color change on said light sensitive strip, a legend associated with each color band so that when the band of color most nearly like the color of the exposed light sensitive strip is found the legend associated with said band of color identifies the plants which can best grow in that location, and the light gauge provides information as to the illumination requirements for a plant which is to be grown in that location so that the available light can be augmented or subtracted.

8. The light gauge described in claim 7 wherein each light sensitive strip is provided with an index mark, so that when the pull tab is used so the light sensitive strip moves is out of the envelope until said index mark is adjacent said slit in said support, the light sensitive portion of said strip will be beneath the light filter.

9. A light gauge for plants comprising a planar support, said support having an upper surface and a lower surface, a disc rotatably mounted on said support beneath said lower surface, the surface of said disc abutting said lower surface of said support covered with a light sensitive material which darkens in proportion to the intensity and duration of light falling on it, said disc opaque to light falling on its opposite surface, at least a sector shaped portion of said support formed from a material which attenuates light passing there-through to serve as a light filter, said sector shaped light filter coaxial with and above said disc, a sector shaped opening cut from said support to serve as a window, said window adjacent said sector shaped light filter whereby after the light gauge has been used the portion of the disc exposed to light beneath the light filter can be rotated to the window where its color can be observed, indicia formed on the periphery of said disc, said support having a recess formed therein to reveal the indicia on the periphery of the disc, said indicia spaced around the periphery of said disc in such a way that each time the disc is rotated until a new indicia appears in said recess a new sector shaped portion of the light sensitive disc not previously exposed to light moves beneath the light filter and an adjacent sector of the disc previously exposed to light moves beneath said window, the light filter material of said support selected so the attenuation of the most intense light likely to be encountered over a 24-hour period prevents the sector shaped portion of the disc beneath the light filter from turning completely dark, bands of colors printed on said support, said bands of colors comprising the darker colors of the sectors of the disc after they have been exposed to various intensities of light for 24 hours beneath said light filter to provide a comparison with the color change on said exposed sector of the disc, a legend associated with each color band so when the band of color most nearly like the color of the exposed sector of the disc is found in a location having a fluctuating light intensity, the legend associated with said band of color identifies the plants which can best grow in that location and the light gauge provides information as to the illumination requirements for a plant which is to be grown in that location so that the available light can be augmented or subtracted.

10. A light gauge for plants comprising a support, a plurality of strips of light sensitive material which darken in proportion to the intensity and duration of light falling on it mounted on said support in spaced relation to each other, each strip of light sensitive material covered by a strip of material which attenuates light passing through it and serves as a light filter for the strip of light sensitive material beneath it, each strip of material serving as a light filter covered by a strip of material opaque to light and serving as a cover, the cover and said strip of light filter over each strip of light sensitive material connected to said support in such a way that they can be pulled away from the support when the gauge is in use, the characteristics of said light filter such that when the opaque cover strip is pulled away and the gauge is exposed to the most intense light likely to be encountered over a 24 hour period the attenuation of the light by the light filter prevents the strip of light sensitive material from turning completely dark, bands of colors printed on said support, said bands of colors comprising the darker colors of the strips of light sensitive material after they have been exposed to various intensities of light for 24 hours beneath said light filter strip to provide a comparison with the color change on a strip of light sensitive material when the cover strip has been pulled away and the strip of light sensitive material covered by the light filter strip has been exposed to light for 24 hours in a location having a fluctuating light intensity, a legend associated with each band of color so that when the band of color most nearly like the color of the exposed light sensitive strip is found, the legend associated with said band of color identifies the plants which can best grow in that location, and the light gauge provides information as to the illumination requirements for a plant which is to be grown in that location so that the available light can be augmented or subtracted.

\* \* \* \* \*